April 7, 1953 — O. C. LYTLE — 2,633,691
PICKUP BALER
Filed July 7, 1948 — 3 Sheets-Sheet 1
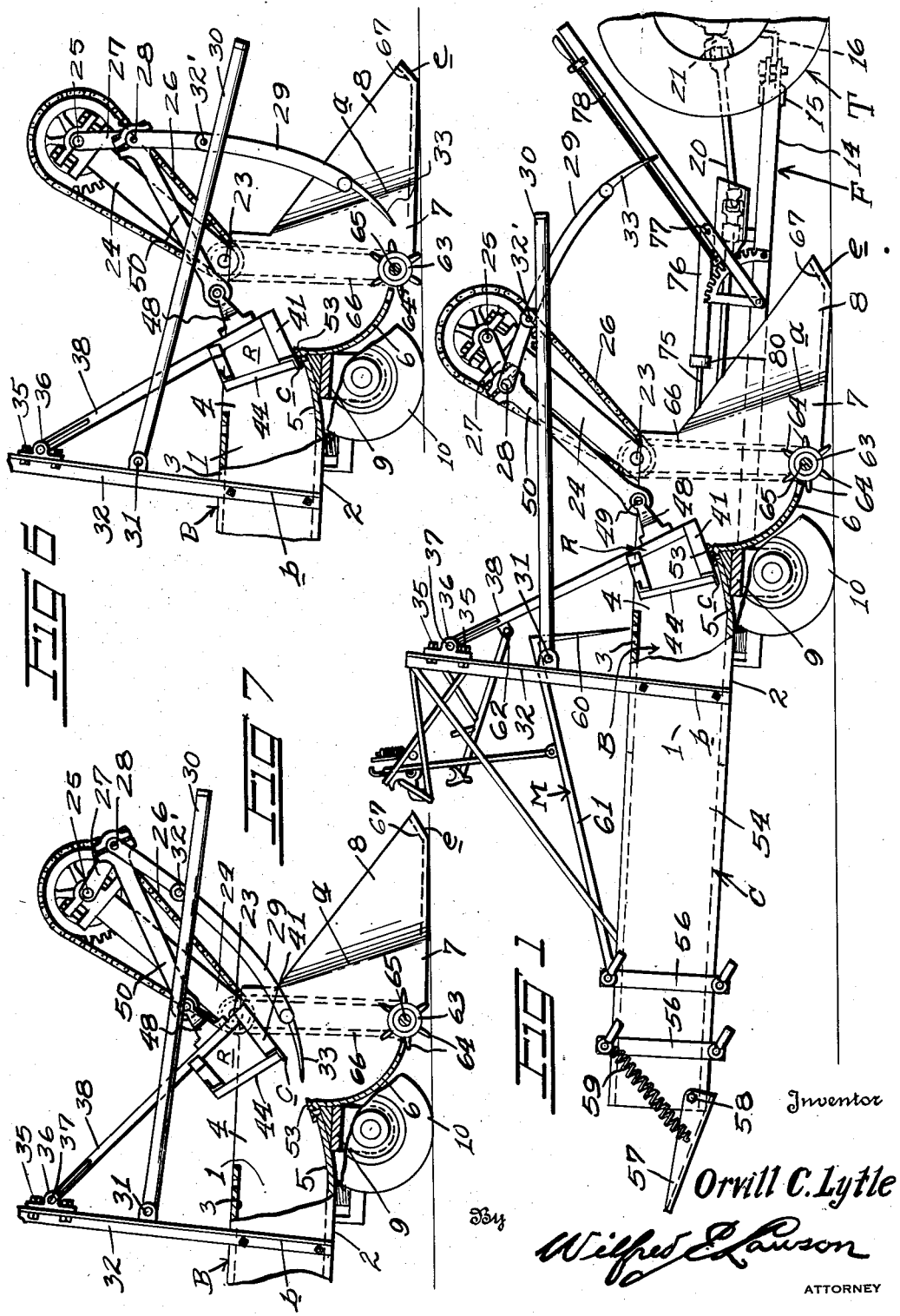
Inventor
Orvill C. Lytle
By Wilfred E. Lawson
ATTORNEY

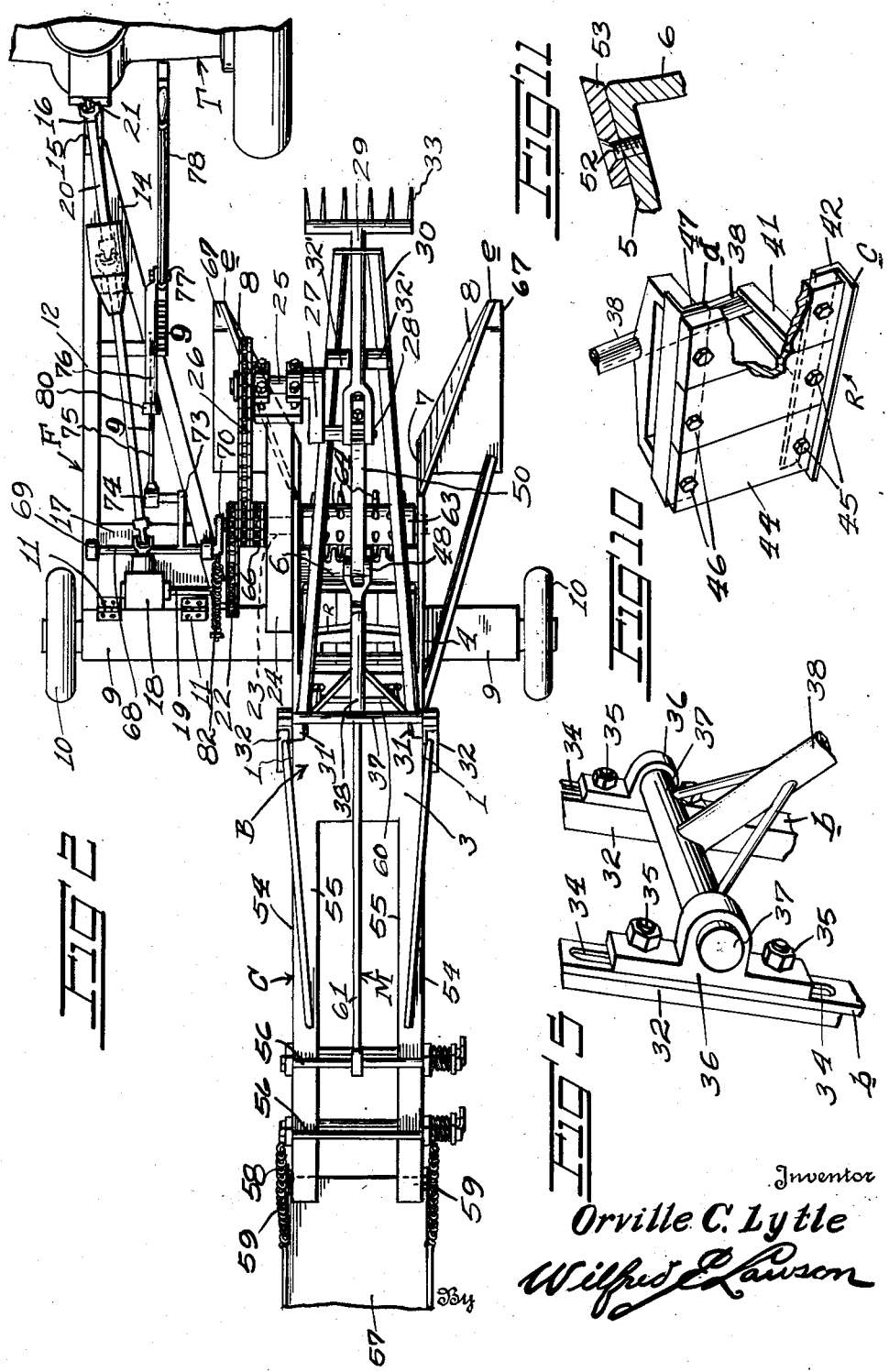

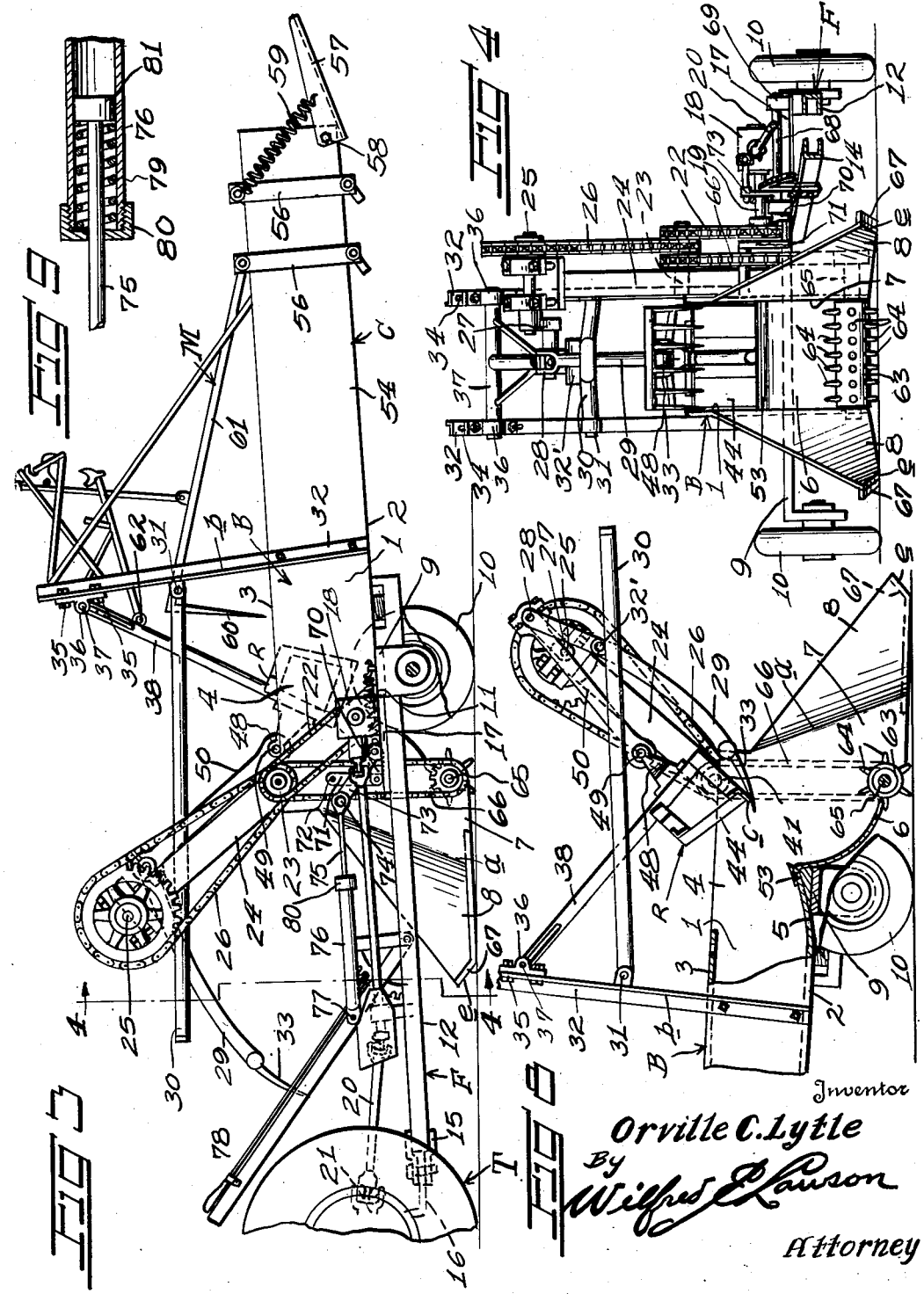

Patented Apr. 7, 1953

2,633,691

UNITED STATES PATENT OFFICE 2,633,691

PICKUP BALER

Orville C. Lytle, Kittanning, Pa., assignor, by mesne assignments, to Original Enderes Company, Guttenberg, Iowa, a corporation of Iowa Application July 7, 1948, Serial No. 37,474

8 Claims. (Cl. 56—341)

This invention relates to a pick-up baler and has relation more particularly to an apparatus of this kind of a "straight-through" type, and it is primarily an object of the invention to provide an apparatus that is adapted to traverse over a field and pick up hay, or similar vegetation in windrows and dicharge such harvested hay or the like from the apparatus in bales.

It is also an object of the invention to provide an apparatus of this kind including a baling compression chamber having positioned directly in advance thereof and having communicating therewith, a pick-up delivery chute, together with means intermittently operating to compress the hay, or the like, within the chamber by forcing and compressing the hay within the baling chamber.

An additional object of the invention is to provide an apparatus of this kind including a pick-up chute discharging within a compression chamber together with means for forking the hay, or the like, in the windrows upon the chute, and to move the hay, or the like, received upon the chute into position to be forced within the baling chamber.

A still further object of the invention is to provide an apparatus of this kind including a baling chamber and a delivery chute therefor positioned in advance thereof together with a fork element for transferring the hay, or the like, from the windrows upon the chute and carrying such hay, or the like, to the baling chamber together with a ram element for forcing the hay, or the like, into the chamber and compressing the same therein.

A still further object of the invention is to provide a machine of this kind including a baling chamber, a collecting chute delivering thereto and wherein a gathering fork or rake element mounted for recurrent movement having recurrent swinging movement for feeding the hay from the windrows to the chute together with a ram also mounted for recurrent swinging movement for forcing the hay as delivered from the chute, into the bale and to compress such material within the baling chamber, said rake element and ram element operating in such timed sequence whereby the rake element is on its inward or working stroke during the period the ram element is on its outward stroke and, furthermore, wherein the relation between the fork element and the ram element is such that as the fork element is on its initial outward stroke, the ram element serves as a medium to clean the tines of the fork element.

The invention also contemplates for an object to provide an apparatus of this kind including a collection chute delivering within a baling chamber together with a major means for feeding hay from windrows upon the chute and wherein a supplemental means is provided for collecting and delivering upon the chute small lengths of hay which may pass under the forward or receiving end portion of the chute.

The invention consists in the detail of construction and in the combination of the several parts of my improved pick-up baler whereby certain advantages are attained as will be hereinafter more fully set forth.

In order that my invention may be better understood I will now proceed to describe the same with reference to the accompanying drawings, wherein:

Figure 1 is a side elevational view, with portions broken away of a pick-up baler constructed in accordance with an embodiment of the invention;

Figure 2 is a view in top plan of the apparatus as illustrated in Figure 1;

Figure 3 is a fragmentary elevational view with parts in section at the side of the apparatus opposite to Figure 1;

Figure 4 is a view in front elevation;

Figure 5 is a fragmentary view in perspective illustrating in detail the mounting for the ram element;

Figure 6 is a fragmentary view partly in side elevation and partly in section showing the ram and feeder or fork element in a second position;

Figure 7 is a view similar to Figure 6 showing the ram and feeder or fork element in further progressive positions;

Figure 8 is also a view similar to Figure 6 showing the ram and feeder or fork element in still further progressive positions; and Figure 9 is an enlarged detail sectional view taken substantially on the line 9—9 of Figure 2.

Figure 10 is a perspective view, partly in section, of the ram.

Figure 11 is a partial sectional view illustrating the mounting of the stationary knife on the open end of the baling chamber.

In the embodiment of the invention as illustrated in the accompanying drawings B denotes a baling chamber including the side walls 1, a bottom wall 2 and a top wall 3. The side walls 1 have forwardly disposed extensions 4. The bottom wall 2 is provided with the forwardly and upwardly curved extension bed plate 5 which has its outer end terminating a material distance inwardly of the outer or forward extremities of the extension 4 of the side walls of the baling chamber B.

Depending from the forward or outer end of the bed plate 5 is the downwardly and forwardly directed collecting chute 6. This chute 6 is concave to coact with the fork element to be hereinafter more particularly referred to.

The extended portions 4 of the side walls 1 have their lower margins formed to conform with the curvature of the bed plate 5 and chute 6. Said lower marginal portions of the extensions 4 are welded or otherwise rigidly secured thereto. The upper marginal edges of the extensions 4 are preferably substantially flush with the top of the baling chamber top wall 3 of the baling chamber.

The outer or forward ends of the side wall extensions 4 are continued by the forwardly disposed wings 7 which extend a predetermined distance below the lower or forward end of the collecting chute 6. The forward portions of the wings 7 are outwardly flared as at 8 from the upper inner ends thereof to a point substantially midway of the wings at the lower marginal edge thereof on the line a.

These outwardly flared portions 8 of the wings serve to provide gathering elements to assure effective guidance of the hay as received from the windrows upon the collecting chute 6.

The apparatus, as herein comprised, is of a type designed to trail a tractor T over the field.

The baling chamber B at its forward portion is securely mounted upon a bolster 9 of a length to extend a material distance beyond opposite sides of the baling chamber B. The outer or opposite end portion of the baler has operatively mounted thereon the ground engaging wheel 10, preferably of a pneumatic type. The bolster 9 to one side of the baling chamber B has hingedly connected thereto as at 11 for vertical movement, a forwardly directed hitch frame F. The frame includes two side members 12 and 14 in forward convergence, with the outer bar 12 preferably substantially at right angles to the bolster 9. The forward or apex portion of this frame F is herein disclosed as provided with an outwardly disposed clevis 15 whereby the frame F may be readily coupled with the draw bar 16 of the tractor T.

The rear portions of the bars 12 and 14 of the frame F and the bolster 9 have secured thereon a platform 17 on which is placed a gear transmission 18 of any preferred type and which in itself forms no part of the invention except as may pertain to the inwardly and laterally disposed driven shaft 19. The drive shaft 20 is associated with the transmission and extends forwardly for operative connection as at 21 with the power take off shaft of the tractor. This is its detail also forms no particular part of the invention as the same is a well known expedient.

Operatively engaged with the driven shaft 19 is a sprocket chain 22 which is also in operative connection with a shaft 23 rotatably supported by a post 24. The post 24 extends upwardly and forwardly from the bolster 9 on a predetermined angle herein disclosed on an angle of approximately 45°. This post 24 is also preferably positioned immediately adjacent to the baling chamber B and between said chamber B and the frame F. The post 24 is disposed forwardly and is of a length to extend beyond the forward end of the wall extensions 4. The outer end of the post 24 rotatably supports a shaft 25 extending beyond opposite sides thereof and in a direction at right angles to the longitudinal axis of the baling chamber B. The outer end portion of the shaft 25 is operatively connected by the sprocket chain 26 with the shaft 23. The inner end portion of the shaft 25 is provided with a crank arm 27 of desired throw. The outer or free end portion of the crank arm 27 is pivotally connected as at 28, to the inner and upper end portion of the elongated arm 29 in the feeding or fork element.

This arm 29 freely passes between the outer or converging end portions of the rods 30 which have their inner or divergent extremities hingedly connected as at 31, to the upstanding posts 32 carried by and at the opposite sides of the baling chamber B and thus defining a vertically disposed support frame.

The arm 29, at a predetermined point away from the connection of the arm 29 with the crank 27 is pivotally connected as at 32' with the rods 30. This pivotal connection constitutes a fulcrum for a rocking action of the feeder or fork element as the shaft 25 rotates while the swinging movement of the rods 30 determine the extent of upward and downward movement of the feeding fork element.

When the crank 27 is in a forward position of approximately 45°, above the horizontal, the fork 33 is at the limit of its inward movement. As the crank 27 continues to move upwardly and rearwardly to a vertical position, the fork 33 is moved slightly forwardly and upwardly and as the crank 27 continues to move inwardly and downwardly for about 90°, the fork 33 continues to move upwardly and outwardly and the rods 30 remain substantially stationary. As the crank continues to swing downwardly and forwardly below the horizontal, the rods 30 swing downwardly with a corresponding lowering of the fork 33 with an outward movement of the fork 33.

After the crank 27 has moved downwardly approximately 45° the continued forward and downward movement of the crank 27 to a depending vertical position will result in an abrupt downward swinging movement of the fork 33 which will be continued inwardly as the crank moves upwardly and forwardly for approximately 45°. As the crank 27 continues to move upwardly for about 22°, the fork 33 will be abruptly moved upwardly but with continued inward travel during said upward movement. As the crank 27 continues to move to its upward vertical position, the fork 33 will move forwardly and on an upward and outward path.

The posts 32 as herein comprised constitute angle irons each having outwardly directed flanges b. The top portions of the flanges b are provided with the longitudinally disposed slots 34 through which are directed the clamping bolts 35 for the bearing members 36. These bearing members 36 rotatably support a shaft 37 extending transversely of the apparatus and spaced between the posts 32. The bearings 36 may be adjusted lengthwise of the posts 32 within the limitations of the slots 34 to assure proper assembly of the ram R for a purpose to be hereinafter more particularly referred to.

Rigid with the central portion of the shaft 37 is an extremity of an elongated straight boom 38, to the outer or free end portion of which is operatively connected the ram R. The boom 38 is of such length as to assure the ram closely approaching and continuing inwardly over the bed plate 5 as the boom 38 swings downwardly and rearwardly.

The lower end of the boom 38, which is preferably a metallic tubing, is welded or otherwise rigidly secured to the inner end portion of a rearwardly directed member of desired length and substantially at right angles thereto. The outer end portion of this member 41 is welded or otherwise rigid with a cross member 42 of a length substantially equal to the distance between the side walls 1 of the baler chamber B and the wall extensions 4. This member 42 herein disclosed constitutes an angle iron having a bottom flange c disposed on a predetermined angle depending upon the required inclination. The head boards 44 of the ram, which are preferably three in number, are of wood. These boards 44 are held to the member 42 by the removable bolts 45 which are disposed through the lower portions of the applied boards 44 and the rear flange of the member 43. Bolts 46 detachably hold the upper portions of the applied boards 44 to the depending flange d of the angle cross member 47 which has its central portion welded or otherwise rigidly secured to the boom 38 inwardly of or above the member 42.

The applied bolts 46 are at a predetermined angle with respect to the boom 38 as determined by the position of the ram R with respect to the shaft 37 so that as the boom 38 swings downwardly the ram will have proper entry into the forward or receiving end of the baling chamber to assure proper forcing and compressing of the hay within the baling chamber. The ram boards 44, or ram head as they may be termed, are spaced from the adjacent lower end portion of the boom 38 in accordance with the desired distance of movement of the boards or heads 44 inwardly of the receiving end of the baling chamber B.

The lower portion of the boom 38 is provided in the present embodiment of the invention with an outstanding bracket 48 with which is pivotally connected as at 49, the lower end portion of a pitman extending upwardly and forwardly with its upper or outer end portions operatively connected with the crank 27. The crank 27 has a laterally disposed pin 28 common to both the associated upper extremity of the rod 29 and the upper extremity of the pitman 50.

The mounting and assembly of the ram element R with respect to the mounting and assembly of the fork or feeding element is such that when the fork 33 is in its outermost position the ram boards or head 44 will be at the limit of movement inwardly of the baling chamber B.

As the fork 33 moves inwardly to deliver the hay or the like upon the chute 6 the ram head, or boards 44, moves upwardly and outwardly to a point whereby the lower margins of the head or boards 44 will be in close contact from above with the tines of the fork 33 when the said fork is at the limit of its inward movement. This is of advantage because as the fork 33 begins to move outwardly and the ram boards or head 44 begins to swing inwardly and downwardly, said ram head or boards 44 will serve to clean from the tines of the fork 33, the hay which may have been retained thereby.

Disposed along the outer margin of the bed 5 and removably held thereto by the bolts 52 is a cutting blade 53 and the lower outstanding flange c of the cross member 41 carried by the boom 38 constitutes a second cutting blade for coaction with the blade 53. As the ram head or boards 44 move inwardly at the receiving end of the baling chamber B this blade closely approaches the cutting blade 53 whereby an effective shearing is had of the baling end of the hay charge to assure an effective separation of the various layers comprised in the finished bale, each of said layers of course, constituting a compressed charge of hay initially received within the baling chamber.

It is believed to be obvious from the foregoing that in an apparatus as herein embodied the ram may be termed as of a floating type as it requires no guides or other mechanical adjuncts other than its boom 38 and the shaft 37 for maintaining the ram head at all times in desired effective set position.

To assure effective coaction between the knife blades 53 and c, the bearing members 36 may be selectively adjusted along the posts 32 as the requirements of practice may require.

Immediately to the rear of the bale chamber B is a compression chamber C. As herein disclosed, this compressor chamber C embodies two elongated side walls 54 of desired length which are in continuation of the side walls 1 of the baler chamber. The upper and lower longitudinal margins of these walls 54 are provided therealong with the inwardly disposed track flanges 55 for facilitating the proper passage of the bales rearwardly between the side walls 54.

Associated with the rear or free end portions of the side walls 54 of the compressor chamber C are the compressing elements 56 of desired tension and of a conventional type.

The bales may be discharged from the outer rear end of the compressor chamber C directly upon the ground or, if and when desired may be discharged upon a trailing vehicle through the medium of chute 57 hingedly connected as at 58 to the lower portions of the compression chamber and which chute 57 is normally maintained in desired extended position by the retractile members 59 herein disclosed as coil springs of requisite tension. This chute 57 is of any desired length sufficient to rest upon a side board or other part of a trailing vehicle. However, when the chute 57 is not being employed in connection with a trailing vehicle, the weight of a bale pushed out thereon from within the compression chamber will cause the chute 57 to swing downwardly sufficiently to permit the desired discharge of the bale.

Associated with the baling chamber is a bale tying mechanism M which may be as desired, it only being required that the needles 60 thereof pass through the baling chamber B in a manner, and coacting with the required mechanism, to effect the tying of a bale within required timed sequence.

The particular tying mechanism to be employed with the apparatus as herein embodied may be of any well known type wherein the required needles 60 are carried by a rock arm 61 mounted upon the compressor chamber C and operatively connected as generally indicated at 62 with the boom 38 so that the desired travel of the needles 60 will be had in the necessary timed sequence determined by the movements of the boom 38.

Rotatably supported by and between the wings 7 immediately below the lower marginal portion of the chute 6 is a roller 63 of desired diameter but which is free of direct contact with the ground. Radiating from this roller 63 at spaced points lengthwise thereof and therearound are the fingers 64. The roller 63 is fixed to a shaft 65 which extends beyond the side of the baler B adjacent to the port 24 and has operatively connected therewith a chain 66 which is operatively engaged with the shaft 23. This chain 66 operates to rotate the roller counterclockwise as viewed in Figure 1, so that the fingers 64 will pick up and throw upon the chute 6 such portions of hay which may not be collected by the fork 33. In practice it has been found that by the use of the roller 63 considerable recovery of hay is obtained.

The outer end portion of each of the wings 7 or more particularly the flared portion 8 thereof, is disposed on an upward and forward incline, as at e. To the outer face of the wings is affixed a shoe 67 which defines the portion e and extends inwardly of the flared portion 9. This shoe 67 rides directly on the ground surface but, of course, the upturned forward portion thereof disposed along the edge e serves to facilitate passing over any undue obstructions encountered as the apparatus advances.

The portion of the apparatus in advance of the bolster 9 is substantially in balance with the portion rearwardly of the bolster but under varying working conditions there may be a tendency for the forward portions of the wings 7 to bite into the ground or to unduly swing upwardly, under which conditions the effectiveness of the apparatus would be hindered.

To overcome these disadvantages, a shaft 68 is rotatably supported by the upstanding bearings 69 carried by the bars 12 and 14 of the frame F. This shaft 68 has fixed for rotation therewith a forwardly and substantially horizontally disposed rock arm 70 which terminates in advance of the inner portion of the post 24 and pivotally connected with the outer or free end portion of this rock arm 70 is the lower end portion of a rigid link 71 which has its opposite end portion pivotally connected as at 72 to the adjacent wing 7 so that upon rocking movement of the shaft 68 the forward portion of the apparatus will be correspondingly raised or lowered.

The shaft 68 also carries for rotation therewith a second rock arm 73. This rock arm extends upwardly and has pivotally connected therewith as at 74 an end portion of a forwardly directed rod 75. This rod telescopically engages in a tubular rod 76 and has its opposite end portion as at 77 connected with an operating lever 78. Surrounding the portion of the rod 75 within the tubular rod 76 is an expansible spring 79, herein disclosed as a coil spring of requisite tension and which is interposed between the applied cap 80 on the outer portion of the tubular rod 76 and a head 81 at the inner or inserted extremity of the rod 75, pulling forward on that rock arm. This spring 79 is of a tension to normally maintain the rod 75 and 76 sufficiently rigid to effect the desired raising or lowering of the forward end of the apparatus upon proper operation of the hand lever 78 and which operation of the lever 78 is manually obtained to meet the requirements of practice to assure the apparatus overcoming any abnormal conditions. Operatively engaged with the rock arm 70 is a contractile spring 82, which extends rearwardly and is suitably anchored to the bolster 9 or other convenient part. This spring is of a tension to counteract the tension of the spring 79 to assure the apparatus to be maintained in substantially a floating condition with slight tension on the forward toothed shoe 67 on the ground surface.

From the foregoing description it is thought to be obvious that a pick-up baler constructed in accordance with my invention is particularly well adapted for use by reason of the convenience and facility with which it may be assembled and operated.

I claim:

1. In a baler having an open end baling chamber and a feeding chute substantially in longitudinal alignment and communicating with said open end of the baling chamber, a boom pivoted on an axis vertically displaced from said baling chamber, a ram carried by said boom and constructed and arranged to swing into and out of said open end of said baling chamber, crank means for pivotally oscillating said boom, a support having one end pivotally mounted on the baler and the other end overlying said feeding chute, a feeding fork pivotally mounted adjacent said other end of said support and having its bottom end constructed and arranged to oscillate in said feeding chute toward and away from said open end of said baling chamber, and means pivotally connecting said feeding fork to said crank means to oscillate said feeding fork in timed relation to the oscillation of said ram.

2. In a baler having an open end baling chamber and a feeding chute substantially in longitudinal alignment and communicating with said open end of baling chamber, a boom pivoted on an axis vertically displaced from said baling chamber, a ram carried by said boom and constructed and arranged to swing into and out of said open end of said baling chamber, crank means for pivotally oscillating said boom, a support having one end pivotally mounted on the baler and the other end overlying said feeding chute, an elongated feeding member having its lower end shaped as a baling material engaging element and constructed and arranged to oscillate in said feeding chute toward and away from said open end of said bailing chamber, means pivotally connecting a medial portion of said feeding member to said other end of said support, and means pivotally connecting the top end of said feeding member to said crank means to oscillate said feeding element in timed relation to the oscillation of said ram.

3. In a baler having an open end baling chamber and a feeding chute substantially in longitudinal alignment and communicating with said open end of the baling chamber, a boom pivoted on an axis vertically displaced from said baling chamber, a ram carried by said boom and constructed and arranged to swing into and out of said open end of said baling chamber, a power driven crank, a link connection between said crank and said boom for pivotally oscillating said ram, a feeding fork pivotally connected to said crank, and a positioning rod pivotally connected between said feeding fork and the baler and constructed and arranged to guide said feeding fork to oscillate along said feeding chute and away from said open end of said baling chamber in timed relation to the oscillation of said ram.

4. In a baler having an open end baling chamber and a feeding chute substantially in longitudinal alignment and communicating with said open end of the baling chamber, a boom pivoted on an axis vertically displaced from said baling chamber, a ram carried by said boom and constructed and arranged to swing into and out of said open end of said baling chamber, a power driven crank, a first link connection between said crank and said boom for pivotally oscillating said ram, an elongated feeding member pivotally connected at one end to said crank and having hay handling means formed on its other end, and a positioning link pivotally connected between an intermediate portion of said feeding member and a stationary point on the baler, and constructed and arranged to guide said feeding member to oscillate along said feeding chute and away from said open end of said baling chamber in timed relation to the oscillation of said ram.

5. In a baler having an open end baling chamber and a feeding chute substantially in longitudinal alignment and communicating with said open end of the baling chamber, a first support post extending vertically above said baling chamber, a second support post extending vertically above said feeding chute, a boom pivoted on one of said support posts, a ram carried by said boom and constructed and arranged to swing into and out of said open end of said baling chamber, a power driven crank mounted on the other of said support posts, a link connection between said crank and said boom for pivotally oscillating said ram, an elongated feeding member pivotally connected at one end to said crank and having hay handling means formed on its other end, and a positioning link pivotally connected between an intermediate portion of said feeding member and said first support post, said positioning link being constructed and arranged to guide said feeding member to oscillate along said feeding chute toward and away from said open end of said baling chamber in timed relation to the oscillation of said ram.

6. A pick up baler comprising a mobile frame, means on said frame defining an open end baling chamber, means defining a feeding chute disposed in longitudinal alignment with said baling chamber and having the forward end thereof disposed adjacent the ground and the rearward end communicating with said baling chamber, means at said forward end of said feeding chute for gathering material to be baled from the ground, a boom pivoted on an axis vertically displaced from said baling chamber, a ram carried by said boom and constructed and arranged to swing into and out of said one end of said baling chamber, crank means for pivotally oscillating said boom, a support having one end pivotally mounted on the baler and the other end overlying said feeding chute, a feeding fork pivotally mounted on said other end of said support and having its bottom end constructed and arranged to oscillate the full length of said feeding chute toward and away from said open end of said baling chamber, and pivot means connecting said feeding fork and said crank means to oscillate said feeding fork in timed relation to the oscillation of said ram, whereby said feeding fork transfers material to be baled from ground elevation to said baling chamber.

7. In a baler having an open end baling chamber, a generally horizontally disposed first knife blade mounted on one edge of said open end, a vertically disposed support frame, a bearing unit, means for adjustably mounting said bearing unit on said support frame to permit vertical adjustment of said bearing unit, a boom pivotally supported by said bearing unit, means for pivotally oscillating said boom, a ram head on said boom constructed and arranged to swing into and out of said open end of said baling chamber, and a second horizontally disposed knife blade mounted on said ram head and cooperable with said first knife blade to shear off excess baling material, whereby the shearing action of said knife blades is adjustable by shifting the vertical position of said bearing unit.

8. In a baler having an open end baling chamber, a first knife blade mounted on one edge of said open end, a ram insertable in said open end of said chamber, means for pivotally mounting said ram on an axis remote from said chamber for swinging movement into and out of said open end of said baling chamber, a second knife blade carried by said ram and cooperable with said first knife blade to shear off excess baling material, and means for shifting the pivotal mounting axis of said ram relative to said baling chamber in the direction normal to said first knife blade, whereby the shearing action of said knife blades may be adjusted.

ORVILLE C. LYTLE.

REFERENCES CITED

The following references are of record in the file of this patent:

UNITED STATES PATENTS

| Number | Name | Date |
| --- | --- | --- |
| 1,239,932 | Miller et al. | Sept. 11, 1917 |
| 1,745,069 | Wallace | Jan. 28, 1930 |
| 1,979,974 | MacGregor | Nov. 6, 1934 |
| 2,293,679 | Barker | Aug. 18, 1942 |
| 2,417,309 | Lisle et al. | Mar. 11, 1947 |
| 2,464,684 | Hill | Mar. 15, 1949 |
| 2,467,717 | Acton | Apr. 19, 1949 |
| 2,487,938 | Nikkel | Nov. 15, 1949 |
| 2,498,319 | Vutz et al. | Feb. 21, 1950 |

FOREIGN PATENTS

| Number | Country | Date |
| --- | --- | --- |
| 19,367 of 1934 | Australia | June 18, 1935 |
| 447,365 | Great Britain | May 18, 1936 |
| 606,825 | Germany | Dec. 11, 1934 |
| 652,522 | Germany | Nov. 2, 1937 |